(No Model.)
J. S. RIGBY.
APPARATUS FOR MAKING SULPHURIC ACID.
No. 292,054. Patented Jan. 15, 1884.
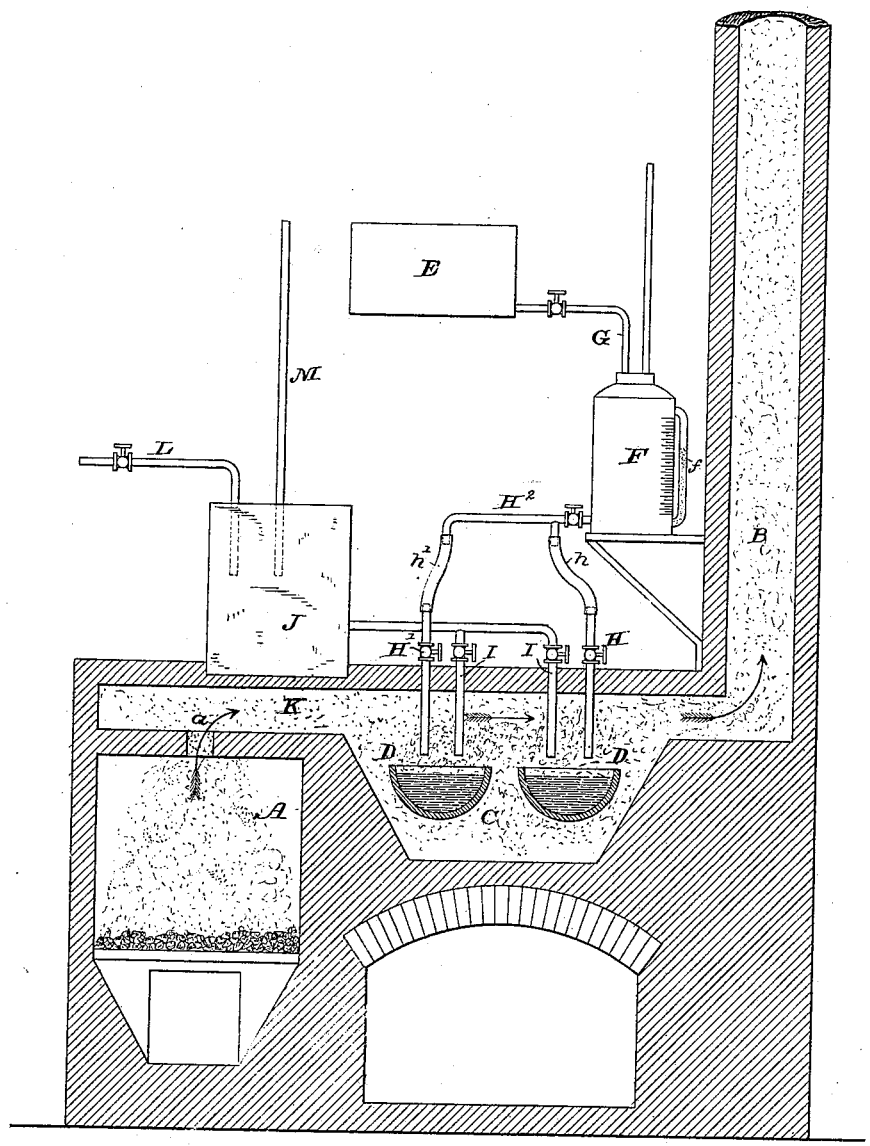
WITNESSES
INVENTOR
John S. Rigby.
By his Attorneys.

UNITED STATES PATENT OFFICE.

JOHN SAMUEL RIGBY, OF BEAUFORT, ASSIGNOR OF ONE-HALF TO FRED BROTHERHOOD, OF CHARLESTON, SOUTH CAROLINA.

APPARATUS FOR MAKING SULPHURIC ACID.

SPECIFICATION forming part of Letters Patent No. 292,054, dated January 15, 1884.

Application filed November 1, 1883. (No model.)

*To all whom it may concern:*

Be it known that I, JOHN S. RIGBY, a subject of the Queen of Great Britain, residing at Beaufort, in the county of Beaufort and State of South Carolina, have invented an Improvement in Manufacturing Sulphuric Acid, of which the following is a specification.

By the usually-practiced method of manufacturing sulphuric acid from sulphur or sulphur-bearing ore (pyrites) the sulphur or ore is burned in kilns, to which a sufficient quantity of air is admitted to convert the sulphur into sulphurous-acid gas, and this gas passes to and through an oven or ovens in which nitrate of soda is decomposed by sulphuric acid, after which it passes, together with nitrogen compounds, by a flue or flues, to a chamber or chambers, to be converted into sulphuric acid at the expense of part of the oxygen of the nitric-acid gas resulting from the decomposition of the nitrate of soda, the nitric-acid gas being in its turn converted into nitric oxide.

My object is to provide improved apparatus for practicing this method, and by means of which the nitrate of soda is decomposed in proper quantity to convert the sulphurous acid into sulphuric acid, thus insuring certainty in production and facilitating the working of the apparatus. I accomplish the object sought by supplying nitrate of soda in solution and hot sulphuric acid, both in regulated quantities, to insure complete decomposition to the nitrate-oven from sources of supply outside the oven, the solution and the sulphuric acid being allowed to run as needed into the usually employed nitrate pans or pots in the oven.

The accompanying drawing shows a sectional elevation of apparatus the same in most respects as heretofore commonly used.

A is the sulphur-burner or ore-kiln, from which the sulphurous acid passes at *a* in the direction of the flue B and to the niter oven or chamber C, in which any desired number of pots or pans, D, are provided. A solution of nitrate of soda of proper strength (preferably as strong a solution as possible below the crystallizing-point) is provided in a suitable tank or reservoir, E, which is connected with a vessel, F, by a pipe, G, provided with a stop-cock.

The vessel F is made of lead or other suitable material—such as glass or stone ware—and provided with an indicator or gage, *f*, to show the level of its contents and indicate with certainty how much thereof is allowed to pass at proper times to the nitrate-pans by means of glass supply-pipes H H', provided with stop-cocks. The supply-pipes H H' pass through the top of the niter-oven and terminate above and close to the pans D, there being a supply-pipe for each pan flexibly connected by rubber tubing *h h'* with the main outlet-pipe $H^2$. The pans D are supplied with the needed amount of hot sulphuric acid for decomposing the nitrate-of-soda solution, the acid being conducted to the pans in suitable way—as by pipes I, provided with stop-cocks—along which pipes it flows hot from a cistern, J, which cistern is let into the arch over the burner or the niter-oven, or over the passage K. The cistern J may be otherwise heated in suitable way. This cistern is provided with a supply-pipe, L, and overflow-pipe M. By supplying hot sulphuric acid to the pans I avoid the breaking of the pans frequently occasioned by running cold acid into them while they are hot. The converting and concentrating apparatus to which the sulphurous acid and nitrogen compounds pass by the flue B, being such as usually employed, needs no description here.

The amount of sulphuric acid allowed to flow to the pans D at each charging of them previously to the admission to the pans of the solution of nitrate of soda can readily be determined according to the strength of the acid and the amount and strength of the nitrate-of-soda solution with which the pans are supplied at each charge.

I claim as of my own invention—

The combination of the kiln or burner, the niter-oven, its pans, the sulphuric-acid-heating cistern, the vessel provided with the indicator and serving to contain nitrate of soda in solution, the pipes provided with stop-cocks for supplying the solution to the pans, and the pipes for supplying the pans with sulphuric acid, substantially as and for the purpose hereinbefore set forth.

In testimony whereof I have hereunto subscribed my name this 24th day of July, A. D. 1883.

JOHN SAMUEL RIGBY.

Witnesses:
A. E. SCAMMON,
FLORENCE A. D. REED.